United States Patent
Hartenstine

[11] Patent Number: 6,155,740
[45] Date of Patent: Dec. 5, 2000

[54] STROLLER AND A FOLD LATCH ASSEMBLY THEREOF

[75] Inventor: Curtis M. Hartenstine, Birdsboro, Pa.

[73] Assignee: Graco Children's Products Inc., Elverson, Pa.

[21] Appl. No.: 09/172,534

[22] Filed: Oct. 14, 1998

[51] Int. Cl.[7] .................................................. F16C 11/00
[52] U.S. Cl. .............................. 403/102; 403/83; 403/85; 403/321; 280/38; 280/642; 280/647; 280/650
[58] Field of Search ................................ 403/84, 85, 101, 403/102, 326, 327; 280/641, 642, 38, 39, 647, 650, 657, 658

[56] References Cited

U.S. PATENT DOCUMENTS

| | | |
|---|---|---|
| 632,018 | 8/1899 | Merkoolyeff . |
| 867,894 | 10/1907 | Moore . |
| 924,008 | 6/1909 | Smith . |
| 1,053,325 | 2/1913 | Smith . |
| 1,125,934 | 1/1915 | Beasecker et al. . |
| 2,341,117 | 2/1944 | Reinholz . |
| 2,534,539 | 12/1950 | Topper . |
| 2,616,719 | 11/1952 | Heideman . |
| 2,783,053 | 2/1957 | Sheldrick et al. . |
| 3,112,042 | 11/1963 | Leshner ................................. 280/641 |
| 3,459,435 | 8/1969 | Garner . |
| 3,504,926 | 4/1970 | Glaser .................................. 280/642 |
| 3,556,546 | 1/1971 | Garner . |
| 4,023,825 | 5/1977 | Kassai . |
| 4,046,401 | 9/1977 | Kassai . |
| 4,111,454 | 9/1978 | Kassai . |
| 4,126,331 | 11/1978 | Sloan et al. . |
| 4,191,397 | 3/1980 | Kassai . |
| 4,232,897 | 11/1980 | Maclaren et al. . |
| 4,248,443 | 2/1981 | Ohlson . |
| 4,317,581 | 3/1982 | Kassai . |
| 4,335,900 | 6/1982 | Fleischer . |
| 4,362,315 | 12/1982 | Kassai . |
| 4,412,688 | 11/1983 | Giordani . |
| 4,415,180 | 11/1983 | Payne, Jr. ............................. 280/650 |
| 4,542,915 | 9/1985 | Wheeler, III et al. . |
| 4,564,212 | 1/1986 | Orlandino et al. . |
| 4,606,550 | 8/1986 | Cone . |
| 4,610,460 | 9/1986 | Kassai . |
| 4,632,420 | 12/1986 | Miyagi . |
| 4,632,421 | 12/1986 | Shamie . |
| 4,643,445 | 2/1987 | Cabagnero . |
| 4,648,619 | 3/1987 | Jungnell et al. ..................... 280/650 |
| 4,653,951 | 3/1987 | Bodle et al. ...................... 403/102 X |
| 4,660,850 | 4/1987 | Kanagawa et al. . |
| 4,706,986 | 11/1987 | Kassai ................................ 403/85 X |
| 4,741,551 | 5/1988 | Perego . |

(List continued on next page.)

*Primary Examiner*—Lynne H. Browne
*Assistant Examiner*—Danielle Somrak
*Attorney, Agent, or Firm*—Foley & Lardner

[57] ABSTRACT

A fold latch assembly is provided for use with a collapsible stroller. The fold latch assembly includes a latch slidably connected to an arm of the collapsible stroller, a housing pivotally attached to the latch and slidably attached to the rear leg of the stroller, and a mount fixedly attached to rear leg of the stroller. The latch operates to releasably secure the collapsible stroller in an operative position and may be released to allow the stroller to be biased into a collapsed position.

19 Claims, 11 Drawing Sheets

U.S. PATENT DOCUMENTS

| | | |
|---|---|---|
| 4,763,911 | 8/1988 | Gebhard et al. . |
| 4,763,919 | 8/1988 | Kanagawa et al. . |
| 4,768,795 | 9/1988 | Mar . |
| 4,770,437 | 9/1988 | Glaser . |
| 4,817,982 | 4/1989 | Kassai . |
| 4,819,958 | 4/1989 | Perego . |
| 4,832,361 | 5/1989 | Kanagawa et al. . |
| 4,856,809 | 8/1989 | Kohus et al. . |
| 4,886,289 | 12/1989 | Yee et al. . |
| 4,892,327 | 1/1990 | Cabagneo . |
| 4,907,818 | 3/1990 | Chai ................................... 280/650 X |
| 5,074,575 | 12/1991 | Bigo . |
| 5,087,066 | 2/1992 | Mong-Hsing . |
| 5,110,150 | 5/1992 | Chen ................................... 280/650 X |
| 5,143,398 | 9/1992 | Teng . |
| 5,181,735 | 1/1993 | Onishi . |
| 5,201,535 | 4/1993 | Kato et al. . |
| 5,205,577 | 4/1993 | Liu . |
| 5,244,228 | 9/1993 | Chiu . |
| 5,246,272 | 9/1993 | Kato et al. . |
| 5,257,799 | 11/1993 | Cone et al. . |
| 5,362,089 | 11/1994 | Jyan-Tsai . |
| 5,388,852 | 2/1995 | Bigo et al. . |
| 5,417,450 | 5/1995 | Wang . |
| 5,427,402 | 6/1995 | Huang . |
| 5,454,584 | 10/1995 | Haut et al. . |
| 5,460,398 | 10/1995 | Huang . |
| 5,472,224 | 12/1995 | Cabagnero . |
| 5,478,102 | 12/1995 | Haung . |
| 5,511,441 | 4/1996 | Arai . |
| 5,516,142 | 5/1996 | Hartan . |
| 5,524,503 | 6/1996 | Ishikura . |
| 5,590,896 | 1/1997 | Eichhorn . |
| 5,605,409 | 2/1997 | Haut et al. . |
| 5,622,377 | 4/1997 | Shamie . |
| 5,639,174 | 6/1997 | Gonska ................................ 403/101 X |
| 5,645,293 | 7/1997 | Cheng . |
| 5,660,435 | 8/1997 | Eichhorn . |
| 5,669,624 | 9/1997 | Eichhorn . |
| 5,669,625 | 9/1997 | Cabagnero . |
| 5,718,444 | 2/1998 | Huang . |
| 5,722,682 | 3/1998 | Wang . |
| 5,765,855 | 6/1998 | Shiu . |
| 5,765,856 | 6/1998 | Kiser . |
| 5,769,447 | 6/1998 | Huang . |
| 5,769,448 | 6/1998 | Wang . |
| 5,775,718 | 7/1998 | Huang . |
| 5,823,564 | 10/1998 | Kettler . |
| 5,984,327 | 11/1999 | Hsieh et al. ........................ 280/38 X |

STROLLER AND A FOLD LATCH ASSEMBLY THEREOF

BACKGROUND OF THE INVENTION

The present invention relates to collapsible strollers. Specifically, the present invention relates a fold latch assembly adapted to releasably secure a collapsible stroller in an operating position and may be released thus allowing the collapsible stroller to be biased into a collapsed position.

Strollers are generally known in the art. Typically such devices include a frame constructed from a plurality of tubular members. The tubular members often have a pair of forward legs, a pair of rearward legs, a pair of arms and a handle disposed between the arms. Attached to the frame is a child support. To increase the versatility of such devices, it has been found to be desirable to provide strollers that are collapsible. Accordingly, such frames after include a plurality of joints between the various tubular members such that the stroller may be pivoted between a collapsed position and an operative position. Further, several latches are often employed to allow the device to be securely retained in the operative position, when such is desired by the user, and to be releasable into the collapsed position, when doing so is desirable.

To advance the art, various latch mechanisms have been suggested for use with stroller. For instance, one such device is disclosed in U.S. Pat. No. 5,454,584 to Haut et al. The collapsible stroller to Haut et al. includes a first locking device having a slidable catch dispose surrounding a lower portion of each of the arms. The slidable catch is oriented to releasably receive an end of the forward leg and abut a first hinge on the forward leg. Although devices built in accordance with the teachings of Haut et al. substantially improve the art, several improvements would still be desirable. For instance, such devices require the user to digitally grasp the slidable catch on both arms. Accordingly, the user would be required to utilize both hands to perform such an operation. In addition, latches designed in accordance with Haut et al. utilize a substantial amount of material and occupy a significant amount of space. Also, a child may inadvertently insert objects such as a finger and the like between the slidable catch and the first hinge thereby pinching or otherwise harming the child. Such regions are undesirable and commonly known in the industry as pinch points.

To further improve upon the device to Haut et al., other advancements have been made in the art. For instance, U.S. Pat. No. 6,068,248 issued to Kakuda, commonly assigned a herein incorporated by reference, suggests a latch mechanism having a one hand release mechanism. Specifically, the device to Kakuda includes a release mechanism disposed on the handle and a slidable catch disposed on each of the arms. A wire is disposed within the arms at interconnects the release mechanism to the slidable catch on each arm of the stroller such that both slidable catches may be actuated simultaneously by operating the release mechanism. Although the device to Kakuda substantially improves the art, such devices could still be further improve upon. Kakuda utilizes a slidable catch similar to Haut. Accordingly, the device to Kakuda provides many of the same drawbacks as found in Haut et al. Specifically, the slidable catch to Kakuda utilizes a significant amount of material and occupies a substantial amount of space. Further, a child may inadvertently insert objects between the slidable catch and the first hinge thereby pinching or otherwise harming the child.

Other devices have been suggested to provide a collapsible stroller that reduces the amount of material utilized and space occupied. For instance, U.S. Pat. No. 5,181,735 to Onishi discloses a foldaway baby carriage and folding mechanism employed therein. The folding mechanism includes a locking block disposed on an exterior surface of an arm and connected to an unlocking button by a wire running through the arm. A spring engaged between the locking blocks and the handle telescopically urges the locking blocks away from the arm. The locking block engages reversal members, which are pivotally interconnected between the arms and the rear legs, to lock the stroller in an operating position.

Although devices constructed in accordance with Onishi may provide certain advantages such devices also have several drawbacks. For instance, the device to Onishi utilizes a locking block disposed around at least a portion of the exterior surface of the arm. As such, the device to Onishi utilizes a substantial amount of material and occupies a significant amount of space. Another drawback of the device to Onishi is that it still includes several pinch points. Specifically, a pinch point may occur between the locking block and the reversal member and between the reversal member and the rearward leg.

Accordingly, one skilled in the art can appreciate that collapsible strollers may still be substantially improved upon. Specifically, it would be desirable to have a fold latch assembly that reduces the amount of material utilized. In addition, it would be desirable to have a device that operates effectively while also reducing the amount of space occupied by such a fold latch assembly. Further, it would be desirable to have a device which reduces the opportunity for injury by reducing pinch points.

SUMMARY OF THE INVENTION

It is an object of the present invention to provide a collapsible stroller having a fold latch assembly.

Another object of the present invention is to provide a fold latch assembly that occupies a minimal amount of space.

A further object of the present invention is to provide a fold latch assembly that utilizes a minimal amount of material.

Still a further object of the present invention is to provide a fold latch assembly that reduces pinch points present in the fold latch assembly.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

According to the present invention, there is provided a fold latch assembly for releasably interconnecting a frame comprising at least a first tubular member and at least a second tubular member. The assembly includes a latch slidably connected within the first tubular member. The assembly also includes a mount fixedly attached to the second tubular member. Lastly, the assembly includes a housing slidably connected to the second tubular member and pivotally connected to the latch.

In use, the latch may be telescopically biased between an extended position extending from said first tubular member and a retracted position wherein the latch is drawn inwardly relative to the first tubular member. The latch is pivotally connected to the housing and may be pivoted between an operative position and a collapsed position. As the first tubular member is pivoted relative to the second tubular member, the housing is slid along the second tubular member. The operative position is achieved when the latch is coupled to the mount. The fold latch assembly may be released from the operative position into the collapsed position by biasing the latch into the retracted position and thus away from the mount thereby allowing the first tubular member to be pivoted relative to the second tubular member.

One skilled in the art can appreciate that the above described invention provides several advantages. The present invention includes a latch that is fitted within the first tubular member and is relatively compact in size. As such, the amount of material utilized as well as the space occupied by the latch is thereby reduced. Still another advantage of the present invention is that the latch is telescopically biased within the tubular member. As such, the incorporation of the latch within the tubular member thereby reduces the opportunity for injury by the latch since the first tubular member operates as a sleeve substantially isolating the latch from contact by the child or other individual.

It is to be understood that both the foregoing general description and the following detailed description are exemplary and explanatory and are intended to provide further explanation of the invention as claimed.

DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DESCRIPTION OF THE PREFERRED EMBODIMENT

Reference will now be made in detail to the preferred embodiments of the present invention, examples of which are illustrated in the accompanying drawings. Wherever possible, the same reference numbers will be used throughout the drawings to refer to the same or like parts. The invention will now be further clarified by the following example, which is intended to be purely exemplary of the invention.

Figure 1:
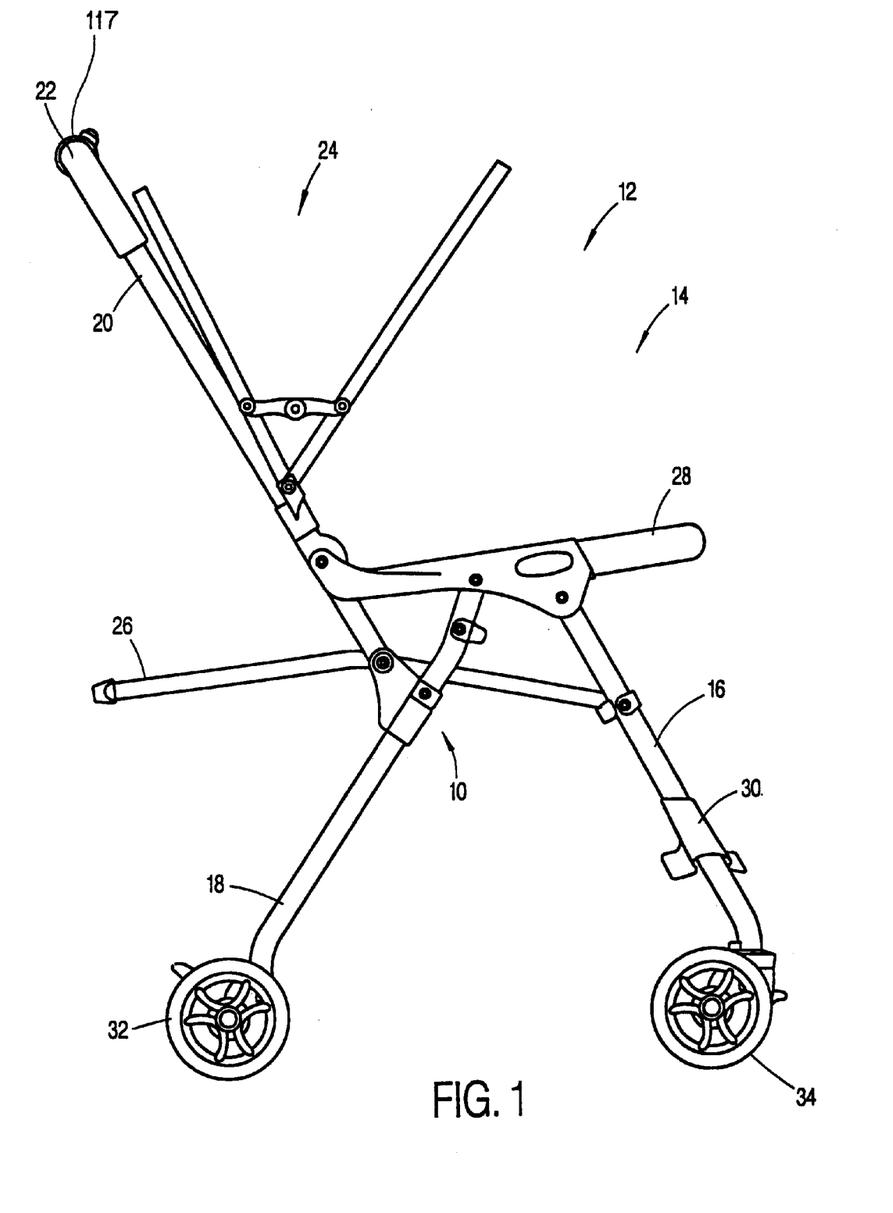
FIG. 1 is a side elevational view of the stroller of the present invention.

According to the present invention, there is provided a fold latch assembly 10 for use on a collapsible stroller 12. As seen in FIG. 1, the collapsible stroller 12 includes a fame 14 defined by a plurality of tubular members. Specifically, the frame 14 includes at least one forward leg 16 and at least one rearward leg 18 disposed rearwardly relative to the forward leg 16. The frame 14 also includes at least one arm 20 pivotally attached to the rearward leg 18. FIG. 1 shows a side elevational view of the collapsible stroller 12; however, one skilled in the art can appreciate that the other side of the collapsible stroller 12 is substantially a mirror image of the side shown in FIG. 1. Accordingly, the collapsible stroller 12 includes a pair of forward legs (one shown as forward leg 16), a pair of rearward legs (one shown as rearward leg 18), a pair of arms (one shown as arm 20) and a handle 22 interconnecting the pair of arms (one shown as arm 20). As shown in FIG. 1, the collapsible stroller 12 preferably includes a canopy support 24 attached to the arm 20, a basket support 26 suspended from the frame 14, a child restraint member 28 attached to the frame 14, a foot rest 30 attached to the forward leg 16, a rear wheel 32 attached to the rearward leg 18, a forward wheel 34 attached to the forward leg 16, and a child support, not shown, attached to the frame 14.

Figure 2:
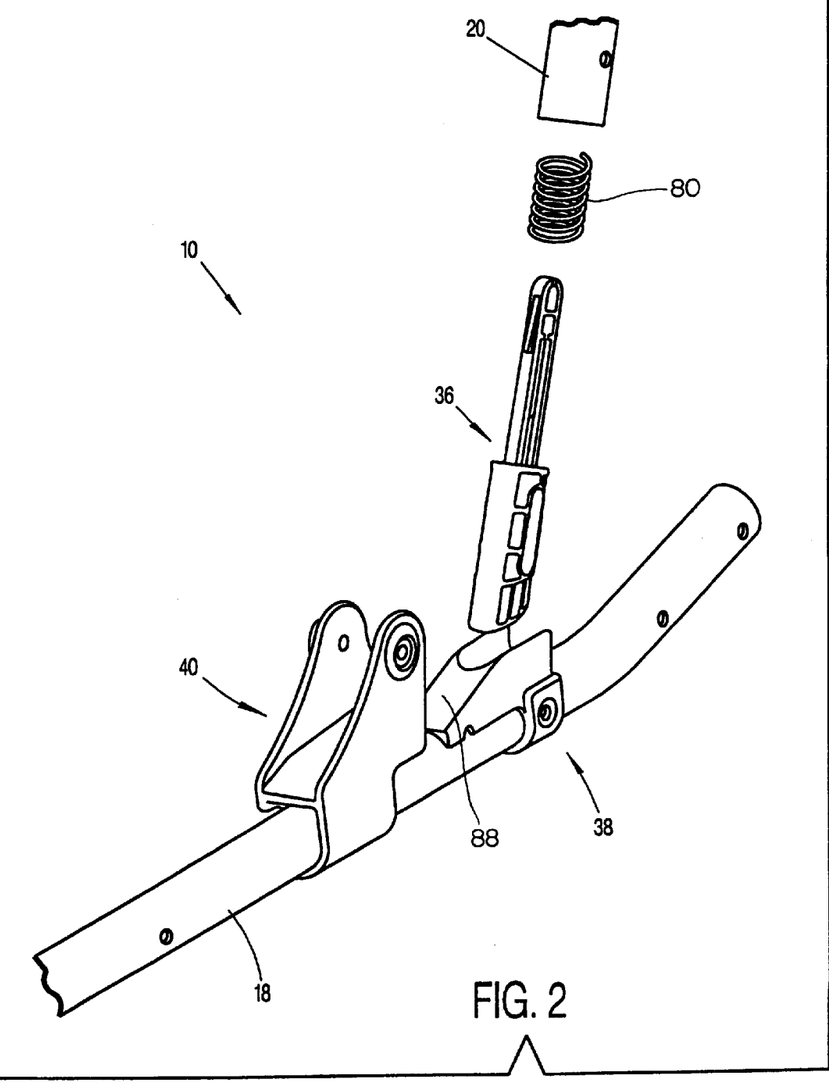
FIG. 2 is an exploded perspective view of a fold latch of the present invention.

The collapsible stroller 12 further includes at least one fold latch assembly 10 for releasably securing the collapsible stroller 12 between an operative position and a collapsed position. As shown in FIG. 2, the fold latch assembly 10 includes a latch 36 slidably attached within the arm 20, a mount 38 fixedly attached to the rearward leg 18, and a housing 40 slidably connected to the rearward leg 18. The above disclosed orientation has been described in terms of a preferred embodiment. However, one skilled in the art can best appreciate that the novel aspects of the present invention may be employed on various different tubular members other than those specifically described above without departing from the teachings of the present invention.

Figure 8:
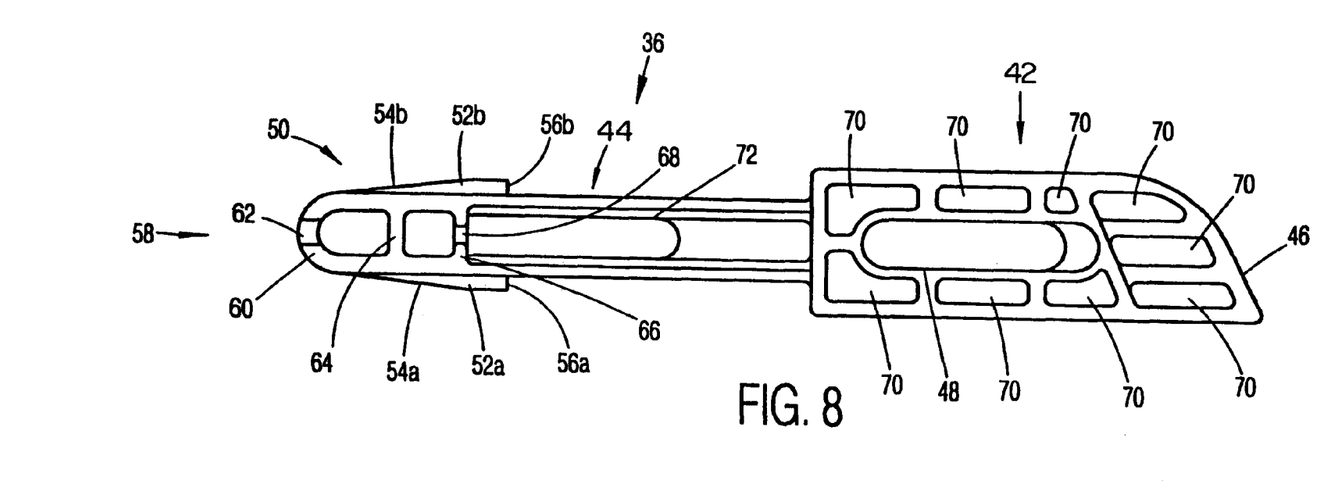
FIG. 8, is a side elevational view of the latch of the present invention.
Figure 9:
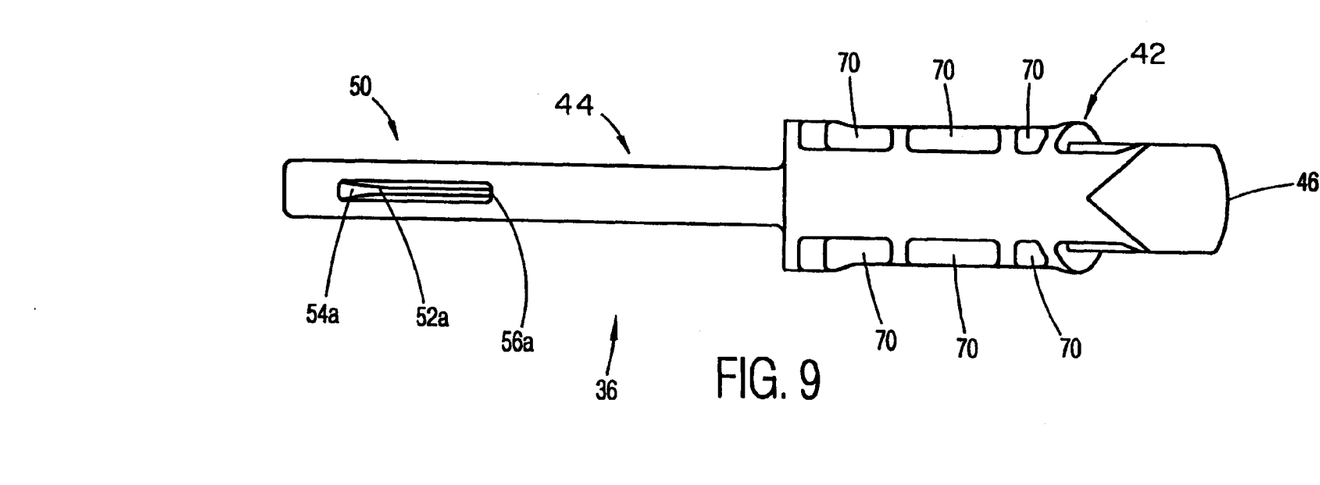
FIG. 9 is a top plan view of the latch of the present invention.

As best appreciated with reference to FIGS. 8 and 9, the latch 36 includes a piston 42 and a stem 44 coaxially aligned with the piston 42 and extending therefrom. The piston 42 includes a cam face 46 oppositely disposed relative to the stem 44. As best appreciated with reference to FIG. 8, the cam face 46 has a generally arcuate profile. The piston 42 also includes a slot 48 therethrough. The stem 44 includes a spring retention member 50. Preferably, the spring retention member 50 is a pair of angled ribs 52a, 52b. Each angled rib 52a, 52b is defined by an angled surface 54a, 54b and a normal surface 56a, 56b disposed normal to the stem 44.

The latch also includes a wire securement mechanism 58. The wire securement mechanism 58 includes a plurality of members having a U-shaped groove disposed therein. Each U-shaped groove being oriented transverse relative to the stem 44. Most preferably, the plurality of members includes a first member 60 having a first U-shaped groove 62 transverse relative to stem 44, a second member 64 having a second U-shaped groove, not shown, transverse relative to the stem 44 and opening in a direction rotated approximately 180 degrees relative to the first U-shaped groove 62 on the first member 60, and a third member 66 having a third U-shaped groove 68 transverse relative to the stem 44 and opening in a direction rotated approximately 180 degrees relative to the second groove, not shown, on the second member 64. However, one skilled in the art can best appreciate that various other orientations of the first U-shaped groove 62, second U-shaped groove, not shown, and third U-shaped groove 68 may be utilized without departing from the novel aspects of this invention.

Figure 3:
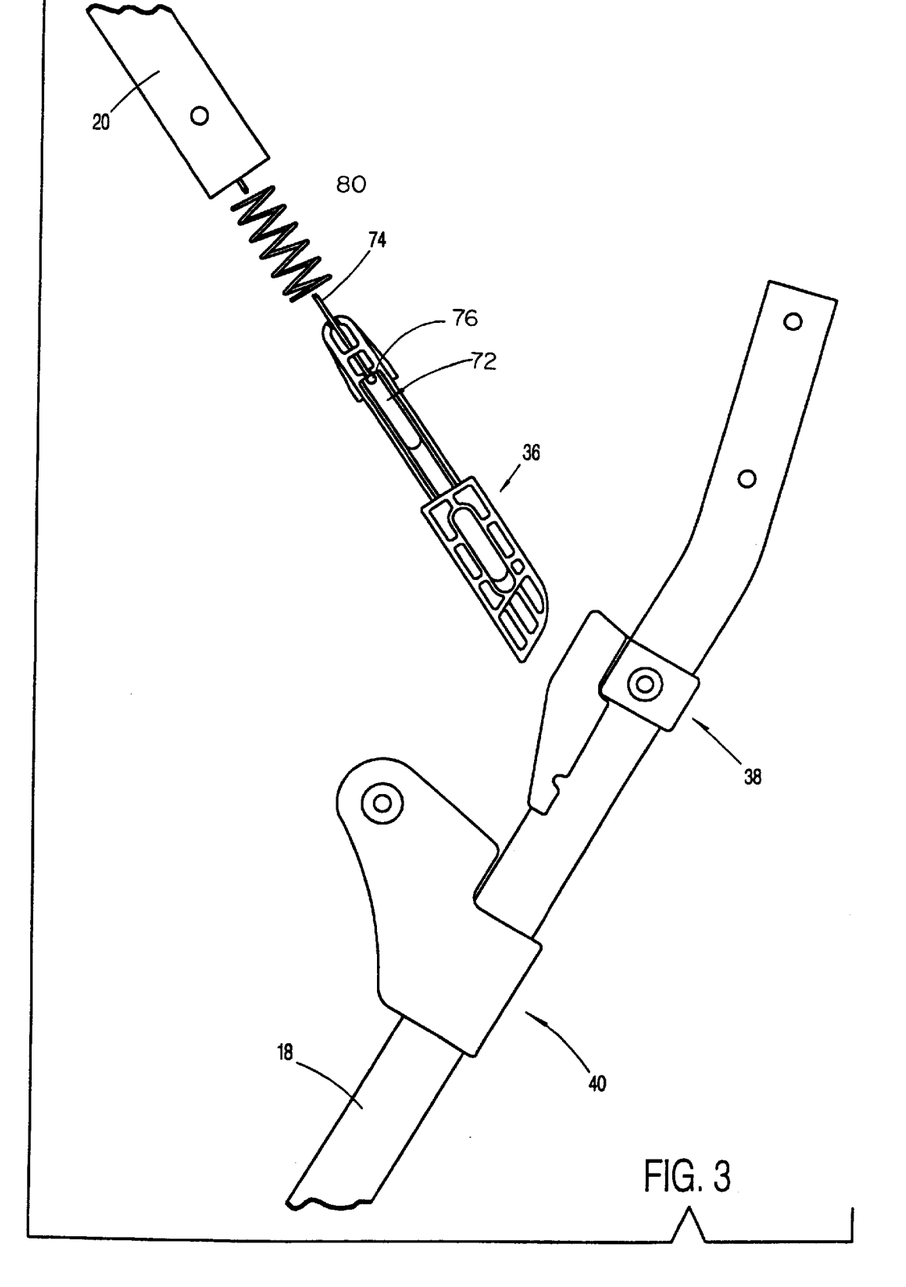
FIG. 3 is an exploded side elevational view of the fold latch.

Most preferably, as best appreciated with reference to FIG. 9, the piston 42 includes a plurality of openings 70. Also, the stem 44 preferably is generally an I-beam type construction having a slit 72 therethrough. As seen in FIG. 3, the fold latch assembly 10 further includes a wire 74 having a diameter. A stop member 76 disposed on the wire 74. Preferably, the wire 74 formed of a metallic material and the stop member 76 is a bead of metallic material secured to the wire 74 sized greater than the diameter of the wire 74. Preferably, the first U-shaped groove 62, the second U-shaped groove, not shown, and the third U-shaped groove 68 is sized approximately less than the size of the bead 76 and sized approximately greater than the diameter of the wire 74.

As seen in FIG. 3, the fold latch assembly 10 further includes a spring 80. Preferably the spring 80 is sized such that the stem 44 is receivable within the spring 80. Similarly, the spring 80 is sized to be receivable within the arm 20. The wire 74 is weaved through the first U-shaped groove 62, the second U-shaped groove, not shown, and the third U-shaped groove 68 and secured in place by bead 76.

Figure 10:
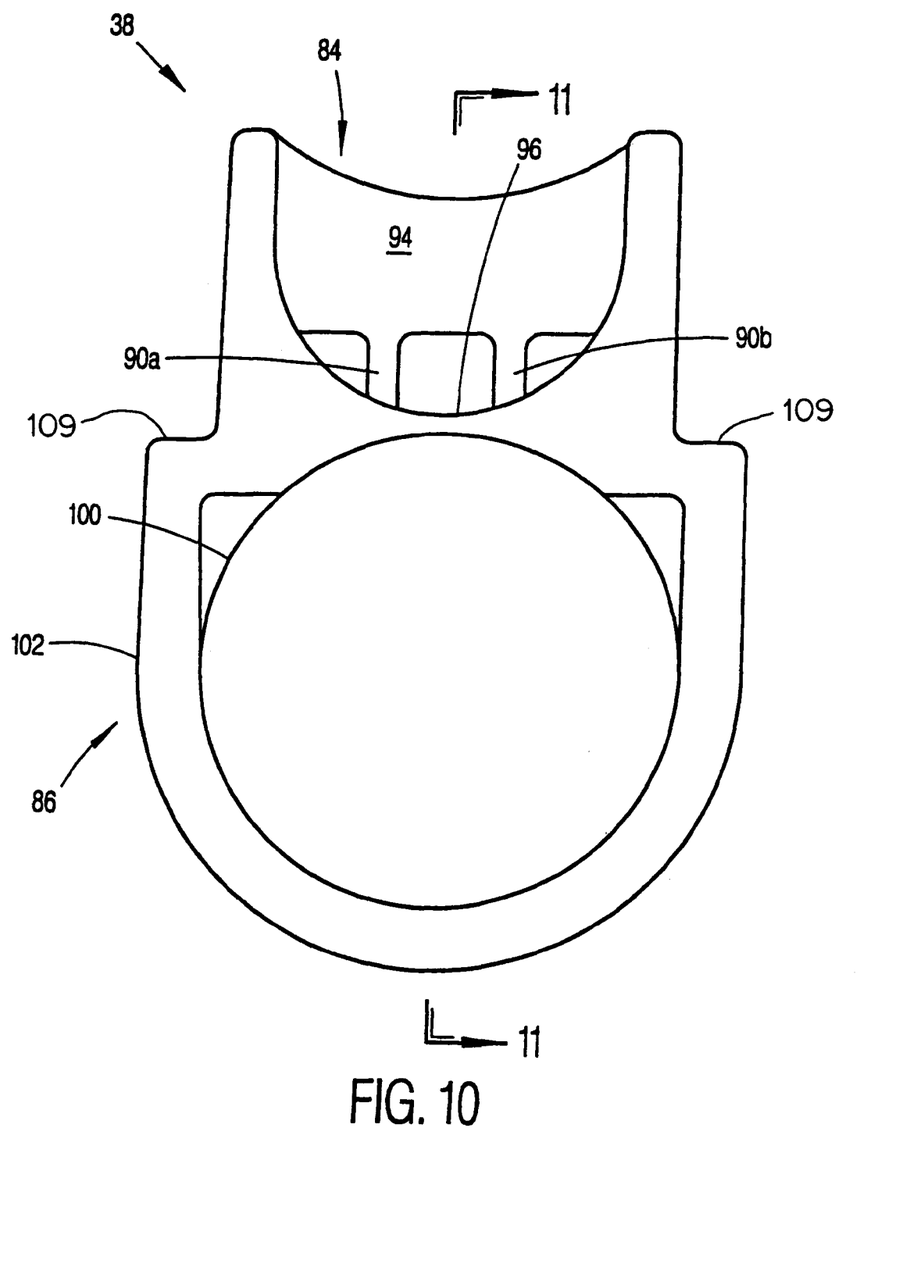
FIG. 10 is rear elevational view of the mount of the present invention.
Figure 11:
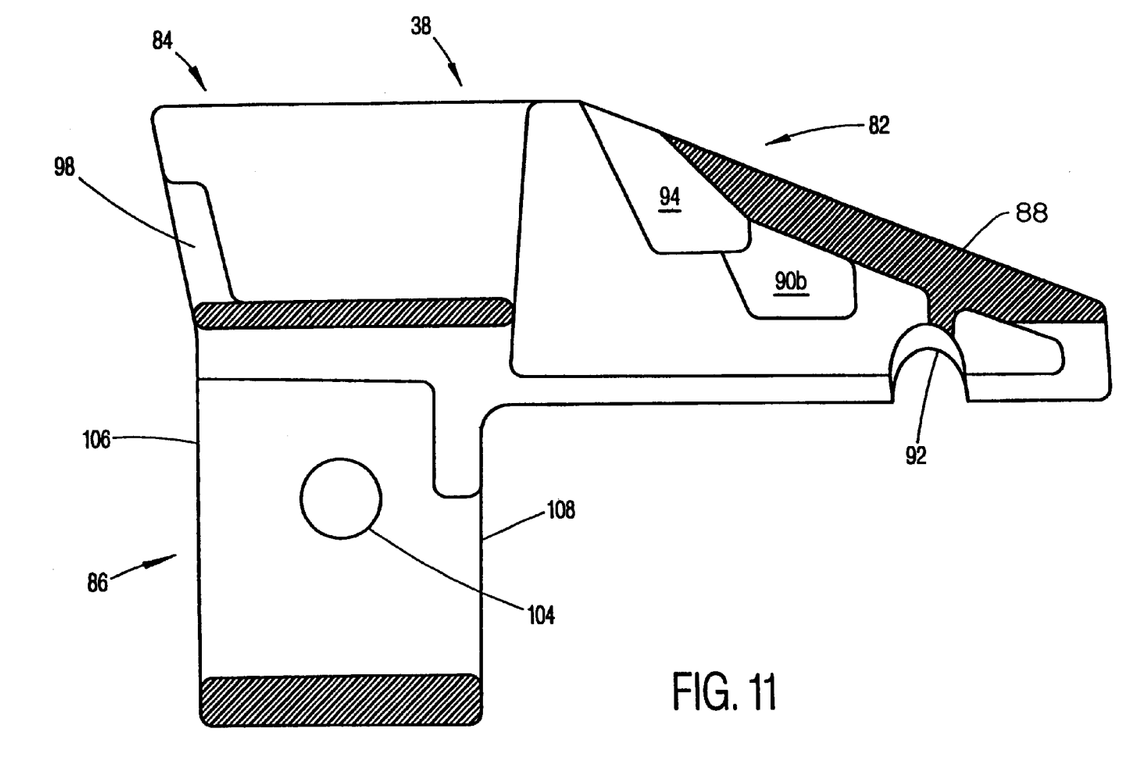
FIG. 11 is a side cross-sectional view of the mount of the present invention.

As best appreciated with reference to FIGS. 10 and 11, the mount 38 of the present invention includes a ramp portion 82. Disposed adjacent the ramp portion 82 is a channel portion 84. Disposed adjacent the channel portion 84 is a collar portion 86. Specifically, the ramp portion 82 includes an upper inclined surface 88. The ramp portion 82 also includes at least one rib. As shown in FIG. 10, the at least one rib is preferably a pair of ribs 90a, 90b. In addition, the ramp portion 82 includes at least one lateral opening 92. The ramp portion 82 further includes a radiused wall 94. The channel portion 84 includes a U-shaped surface 96 and has a rearward opening 98 oppositely disposed relative to the ramp portion 82. The collar portion 86 includes a generally cylindrical inner surface 100 and a U-shaped outer surface 102. A pair of apertures 104, one shown in FIG. 11, extend transversely through the channel portion 84. A post or rivet, not shown, is fitted through the apertures 104 to fixedly secure the mount 38 to the rear leg 18. Lastly, the collar portion 86 includes an outer edge 106, an inner abutment edge 108 oppositely disposed relative to the outer edge 106, and an upper abutment edge 109 disposed between the outer edge 106 and the inner abutment edge 108.

Figure 6:
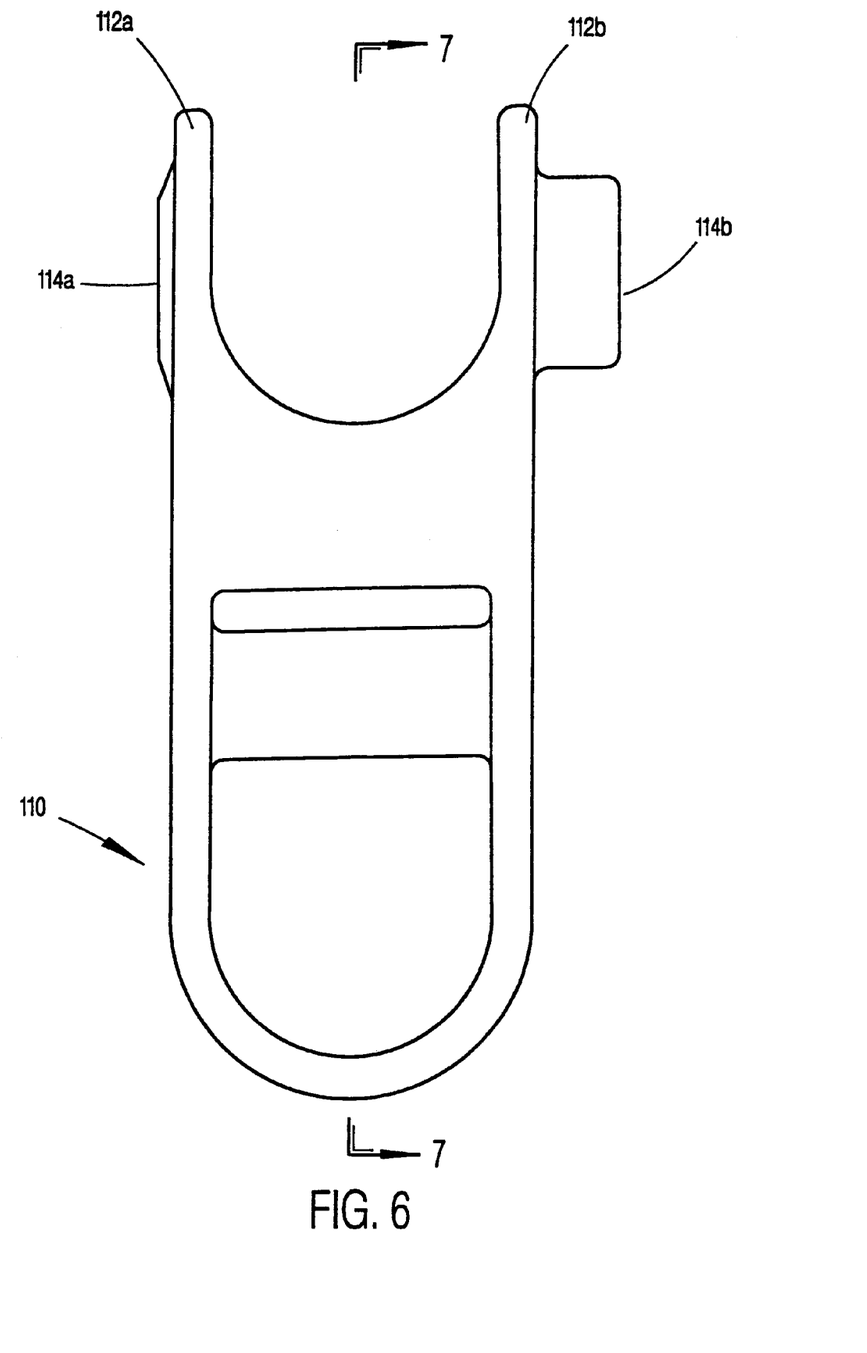
FIG. 6 is a front elevational view of a housing of the present invention.
Figure 7:
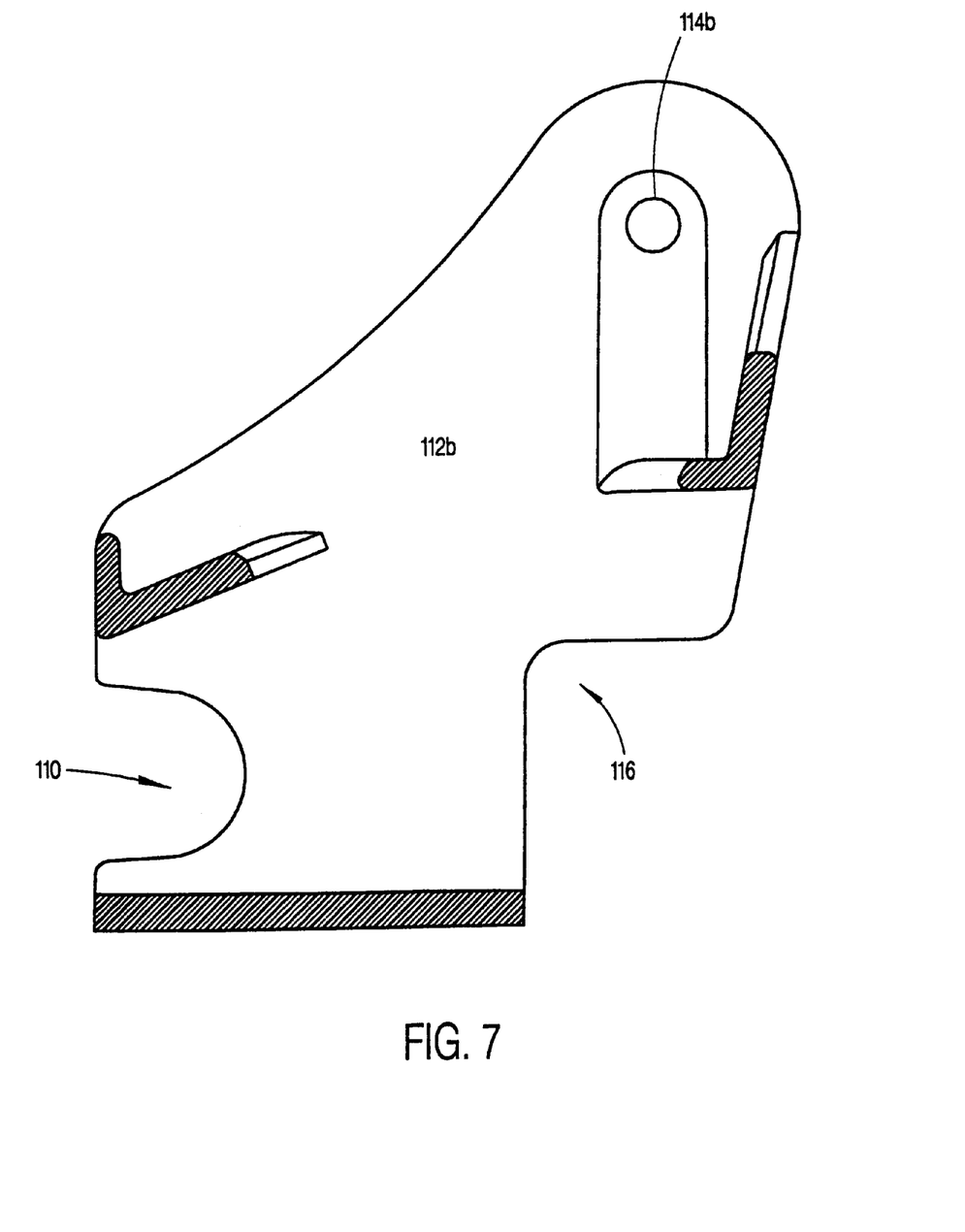
FIG. 7 is a side cross-sectional view of the housing of the present invention along line 7—7 of FIG. 6.

As seen in FIG. 6 and FIG. 7, the housing 40 includes a sleeve portion 110 and a pair of upstanding members 112a, 112b extending from the sleeve portion 110. The upstanding members include a pair of aligned holes 114a, 114b therethrough. Lastly, the sleeve portion 110 has a pair of L-shaped edges 116, one shown in FIG. 7. Each L-shaped edge 116 is sized and shaped to couple with the corresponding inner abutment edge 108 and upper abutment edge 109 of the mount 38.

Figure 4:
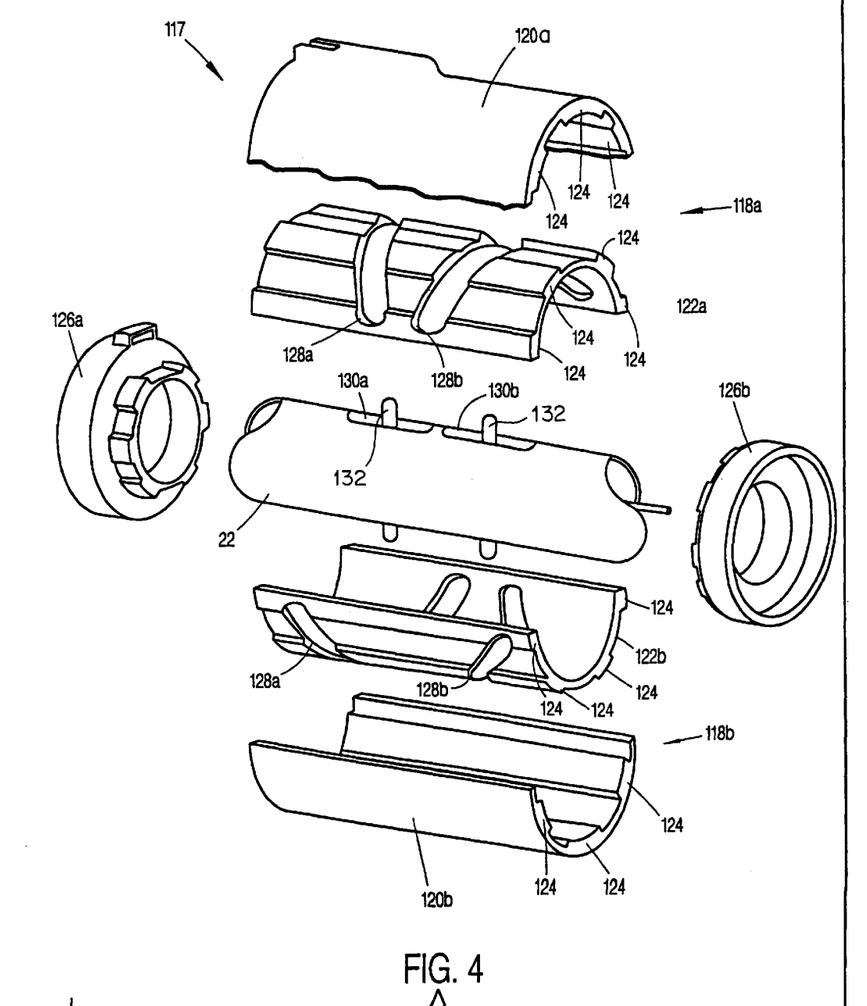
FIG. 4 is an exploded fragmentary perspective view of a release mechanism of the present invention.
Figure 5:
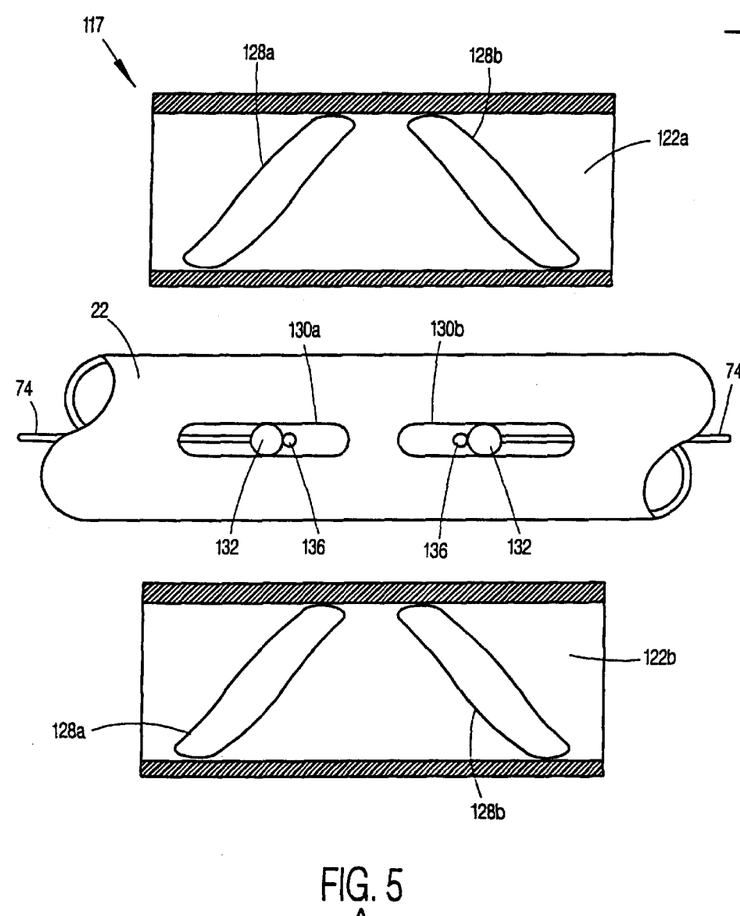
FIG. 5 is a fragmentary bottom plan view of a release mechanism of the present invention.
Figure 12:
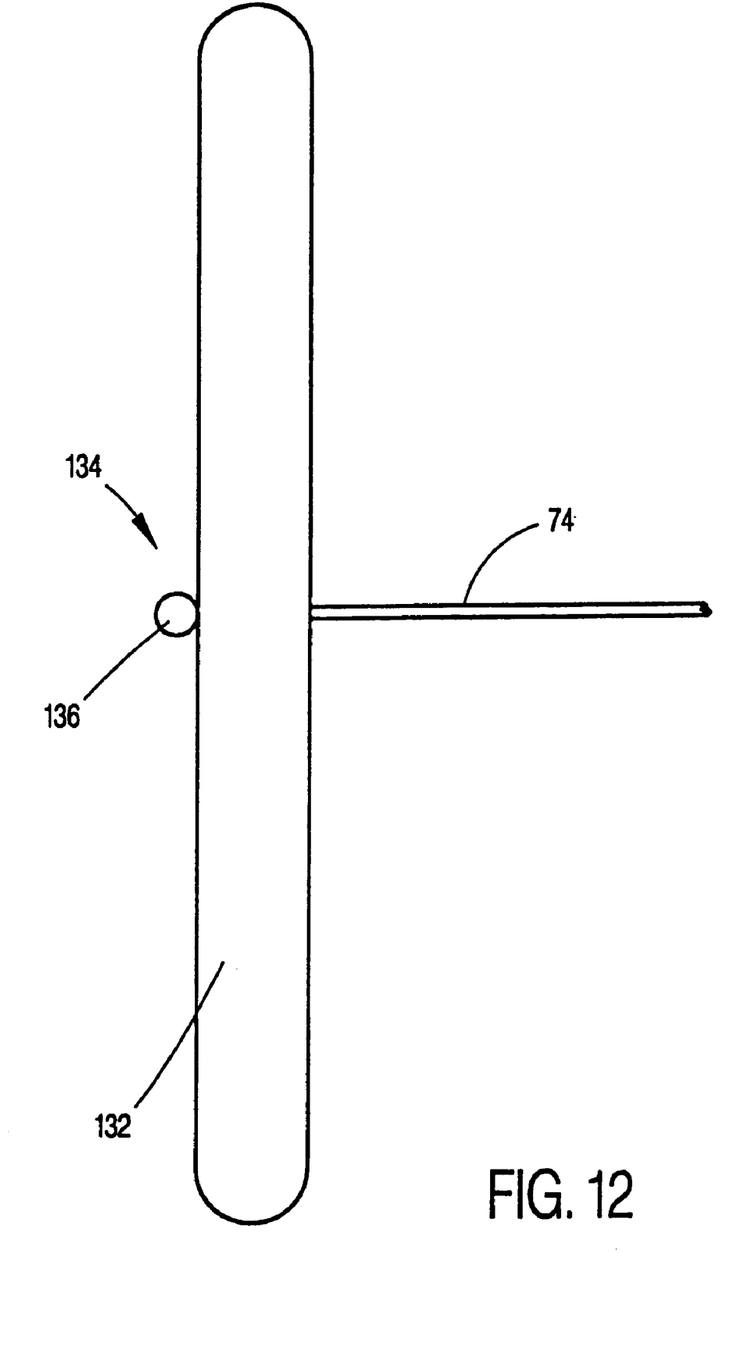
FIG. 12 is a fragmentary top plan view of a wire and pin of the present invention.

In the most preferred embodiment, the fold latch assembly 10, as herein described, is uniquely configured for use with a one-hand release mechanism 117, as shown in FIG. 4. The one-hand release mechanism is more fully described in the U.S. Pat. No. 6,068,284 and herein incorporated by reference. The ore hand release mechanism 117 is disposed on handle 22 and includes a pair of half shells 118a, 118b. Each half shell 118a, 118b includes an outer member 120a, 120b and a corresponding inner member 122a, 122b. Each inner member 122a, 122b is operatively associated with a corresponding outer member 120a, 120b through splines 124. The half shells 118a, 118b are fitted over the handle 22. End caps 126a, 126b are oppositely disposed about the pair of half shells 118a, 118b. Each half shell 118a, 118b includes a pair of grooves 128a, 128b angularly skewed relative to the handle 22. The handle 22 includes two pair of slots 130a, 130b. Preferably, the collapsible stroller 12 includes a pair of fold latch assemblies 10. Each fold latch assembly 10 having a wire 74 extending through the handle 22 and operatively associated with the release mechanism 117. Specifically, as best seen with reference to FIG. 12, the release mechanism 117 includes a pin 132 attached to the wire 74. The pin 132 is sized to be receivable within a corresponding groove 128a, 128b and receivable within a corresponding slot 130a, 130b. Each pin 132 is secured in place by a stop member 134. Most preferably, the stop member 134 is a bead or sphere 136.

In use, the operator of the present invention may bias the collapsible stroller 12 between an operative position and a collapsed position. To bias the collapsible stroller 12 into the operative position, the operator will simply rotate the arm 20 (counterclockwise in FIG. 1). In so doing the cam face 46 is urged into contact with the angled surface 88 of the mount 38 while simultaneously drawing the housing 40 upwards along the rear leg 18 towards the mount 38. As the operator continues to rotate the arm 20, the angled surface 88 urges the latch 36 to be retracted into the arm 20. Once the latch 36 becomes separated from contacting the angled surface 88, the latch 36 telescopically is urged outward from the arm 20 by the spring 80 and thereby captured within the channel portion 84 of the mount 38 while the L-shaped edge 116 of the housing 40 simultaneously engages the inner abutment edge 108 and upper abutment edge 109. As such, the collapsible stroller 12 is now secured in the operating position.

When it is desirable to collapse the collapsible stroller 12, the operator will tension the wire 74. As described in the preferred embodiment, this may be achieved by operating the one-hand release mechanism 117. Specifically, the operator will rotate the pair of half shells 118. In response, the grooves 128a, 128b pivot relative to the slots 130a, 130b such that the pins 132 are drawn inward towards one another. Accordingly, the respective wire 74 is thereby tensioned and thereby pulls the latch 36 telescopically inward into the arm 20 until the cam face 46 of the piston 42 may escape from the channel and the L-shape member 116 is disengaged from contacting the mount 38. The operator may then pivot the arm 20 (clockwise in FIG. 1) further urging the housing 40 to slide along the rear leg 18 until the collapsible stroller 12 in the collapsed position.

One skilled in the art can best appreciate that the above disclosed invention provides several advantages. Specifically, the present invention reduces the amount of material utilized and the space occupied by the fold latch assembly 10 through use of a latch 36 fitted within the arm 20. In addition, the amount of material is reduced by providing the latch 36 with a plurality of openings 70. The use a plurality of openings 70 provides a sufficient amount of rigidity to the piston 42 while also reducing the amount of material utilized. Further, the amount of material utilized is also reduced by proving a mount 38 that is substantially hollow. However, to maintain a sufficient amount of rigidity the mount 38 includes ribs 90a, 90b to provide support to the inclined surface 88.

Yet another advantage of the present invention is that it reduces the number of pinch points thereby reducing the opportunity for injury due to reduction of pinch points within the fold latch assembly 10. Specifically, providing a latch 36 fitted within the arm 20 thereby substantially isolates the latch 36 from contact by a child or other individual. Secondly, the channel portion 84 includes the rearward opening 98. Accordingly, an object placed within the channel portion 84 may be swept out of the channel portion 84 through the rearward opening 98 as the piston 42 is pivoted into the channel portion 84.

While the above describes the preferred embodiment of the invention, the invention is not intended to be so limited. Other embodiments, which will be, apparent to those skilled in the art, which utilize the teachings herein set forth, are intended to be within the scope of the present invention.

What is claimed is:

1. A stroller comprising:
   a stroller frame having at least a first tubular member and a second tubular member; and
   a fold latch assembly for releasably interconnecting the first and second tubular members, the fold latch assembly comprising:
   a latch slidably movable within the first tubular member;
   a mount fixedly attached to the second tubular member; and
   a housing slidably connected to the second tubular member and pivotally connected to the first tubular member,
   wherein the housing is movable along the second tubular member, toward and away from the fixed mount first tubular member as the first tubular member is pivoted relative to the second tubular member.

2. A stroller according to claim 1, wherein the latch is pivotally and slidably mounted to the housing.

3. A stroller according to claim 2, wherein the latch comprises a piston and a stem attached to the piston.

4. A stroller according to claim 3, wherein the piston has a cam face and a slot.

5. A stroller according to claim 4, wherein the piston is biased to extend outwardly of the first tubular member.

6. A stroller according to claim 5, wherein the mount comprises a ramp portion, a channel portion disposed adjacent to the ramp portion and sized to receive at least a portion of the piston, and a collar portion sized to receive the second tubular member.

7. A stroller according to claim 6, wherein the housing comprises a sleeve portion sized to be slidably disposed around the second tubular member and a pair of upstanding members extending from the sleeve portion, between which the first tubular member is pivotally mounted relative to the housing.

8. A stroller according to claim 7, wherein the housing and the mount are configured to engage one another when the first and second tubular members are angled at a predetermined position and configured to separate when the first tubular member is pivoted away from the predetermined position.

9. A stroller according to claim 5, wherein the fold latch assembly further includes a wire securing mechanism.

10. A stroller comprising:
    a stroller frame having at least a first tubular member and a second tubular member; and
    a fold latch assembly for releasably interconnecting the first and second tubular members, the fold latch assembly comprising:
    a latch mounted to slidably movable within the first tubular member;
    a mount fixedly attached to the second tubular member; and
    a housing slidably connected to the second tubular member,
    wherein the latch comprises a piston and a stem extending from the piston.

11. A stroller according to claim 10, wherein the piston has a cam face and a slot.

12. A stroller according to claim 11, wherein the piston is biased to extend outwardly of the first tubular member.

13. A stroller according to claim 12, wherein the mount comprises a ramp portion, a channel portion disposed adjacent to the ramp portion and sized to receive at least a portion of the piston, and a collar portion sized to receive the second tubular member.

14. A stroller according to claim 13, wherein the housing comprises a sleeve portion sized to be slidably disposed around the second tubular member and a pair of upstanding members extending from the sleeve portion, between which the first tubular member is pivotally mounted relative to the housing.

15. A stroller according to claim 14, wherein the housing and the mount are configured to engage one another when the first and second tubular members are angled at a predetermined position and configured to separate when the first tubular member is pivoted away from the predetermined position.

16. A fold latch assembly for releasably interconnecting a first tubular member to a second tubular member, comprising:
    a latch adapted to be slidably movable within the first tubular member;
    a mount adapted to be fixedly attached to the second tubular member; and
    a housing adapted to be slidably connected to the second tubular member,
    wherein the latch comprises a piston and a stem extending from the piston.

17. A fold latch assembly according to claim 16, wherein the piston has a cam face and a slot.

18. A fold latch assembly according to claim 17, wherein the mount comprises a ramp portion, a channel portion disposed adjacent to the ramp portion and sized to receive at least a portion of the piston, and a collar portion adapted to receive the second tubular member.

19. A fold latch assembly according to claim 18, wherein the housing comprises a sleeve portion adapted to be slidably disposed around the second tubular member and a pair of upstanding members extending from the sleeve portion, between which the first tubular member is adapted to be pivotally mounted relative to the housing.

* * * * *